(12) United States Patent
Kalihari et al.

(10) Patent No.: US 10,857,703 B2
(45) Date of Patent: Dec. 8, 2020

(54) MUTILAYER POLYETHYLENE FILMS, AND ARTICLES MADE THEREFROM

(71) Applicants: Dow Global Technologies LLC, Midland, MI (US); Dow Quimica Mexicana S.A.de C.V., Mexico City (MX)

(72) Inventors: Vivek Kalihari, Missouri City, TX (US); Fabricio Arteaga Larios, Sugarland, TX (US); Jacquelyn A. Degroot, Sugarland, TX (US)

(73) Assignees: Dow Global Technologies LLC, Midland, MI (US); Dow Quimica Mexicana S.A. de C.V., Mexico City (MX)

( * ) Notice: Subject to any disclaimer, the term of this patent is extended or adjusted under 35 U.S.C. 154(b) by 123 days.

(21) Appl. No.: 15/766,394

(22) PCT Filed: Nov. 8, 2016

(86) PCT No.: PCT/US2016/060931
§ 371 (c)(1),
(2) Date: Apr. 6, 2018

(87) PCT Pub. No.: WO2017/099923
PCT Pub. Date: Jun. 15, 2017

(65) Prior Publication Data
US 2018/0281369 A1  Oct. 4, 2018

Related U.S. Application Data

(60) Provisional application No. 62/266,194, filed on Dec. 11, 2015.

(51) Int. Cl.
B32B 7/02 (2019.01)
B29C 39/12 (2006.01)
(Continued)

(52) U.S. Cl.
CPC .......... B29C 39/126 (2013.01); B29C 48/022 (2019.02); B29C 48/08 (2019.02);
(Continued)

(58) Field of Classification Search
CPC ..... B29C 39/126; B29C 48/022; B29C 48/08; B29C 48/18; B29C 48/21; B29D 2009/00;
(Continued)

(56) References Cited

U.S. PATENT DOCUMENTS 3,645,992 A  2/1972 Dow
3,914,342 A  10/1975 Mitchell
(Continued)

FOREIGN PATENT DOCUMENTS

WO  1998/004397 A1  2/1998
WO  2005068188 A1  7/2005
(Continued)

OTHER PUBLICATIONS

PCT/US2016/060931, International Search Report and Written Opinion dated Mar. 28, 2017.
(Continued)

*Primary Examiner* — Lawrence D Ferguson (57) ABSTRACT

A multilayer polyethylene film comprising a core layer, a first outer layer, and a second outer layer, wherein the core layer is positioned between the first outer layer and the second outer layer, the core layer comprises a linear low density polyethylene and, optionally, a first low density polyethylene resin, and the first outer layer and the second outer layer independently comprise a polyethylene resin and, optionally, a second low density polyethylene resin, wherein the density of the linear low density polyethylene is less than the density of the polyethylene resin.

9 Claims, 2 Drawing Sheets

(51) Int. Cl.
| | |
|---|---|
| *B32B 27/32* | (2006.01) |
| *B32B 27/08* | (2006.01) |
| *B32B 27/12* | (2006.01) |
| *B32B 5/02* | (2006.01) |
| *C08J 5/18* | (2006.01) |
| *B29C 48/08* | (2019.01) |
| *B29C 48/21* | (2019.01) |
| *B29C 48/00* | (2019.01) |
| *B32B 3/00* | (2006.01) |
| *B29C 48/18* | (2019.01) |
| *B29L 9/00* | (2006.01) |
| *B29K 23/00* | (2006.01) |
| *B29L 7/00* | (2006.01) |

(52) U.S. Cl.
CPC .............. *B29C 48/18* (2019.02); *B29C 48/21* (2019.02); *B32B 3/00* (2013.01); *B32B 5/022* (2013.01); *B32B 7/02* (2013.01); *B32B 27/08* (2013.01); *B32B 27/12* (2013.01); *B32B 27/32* (2013.01); *C08J 5/18* (2013.01); *B29K 2023/0625* (2013.01); *B29K 2995/0063* (2013.01); *B29L 2007/008* (2013.01); *B29L 2009/00* (2013.01); *B32B 2250/03* (2013.01); *B32B 2250/04* (2013.01); *B32B 2250/242* (2013.01); *B32B 2262/0253* (2013.01); *B32B 2307/54* (2013.01); *B32B 2307/558* (2013.01); *B32B 2307/732* (2013.01); *B32B 2307/748* (2013.01); *B32B 2555/00* (2013.01); *B32B 2555/02* (2013.01); *C08J 2323/06* (2013.01); *C08J 2423/06* (2013.01)

(58) Field of Classification Search
CPC .... B29K 2023/0625; B29K 2995/0063; B29L 2007/008; B29L 2009/00; B32B 2250/03; B32B 2250/04; B32B 2250/242; B32B 2262/0253; B32B 2307/54; B32B 2307/558; B32B 2307/732; B32B 2307/748; B32B 2555/00; B32B 2555/02; B32B 27/08; B32B 27/12; B32B 27/32; B32B 3/00; B32B 5/022; B32B 7/02; C08J 2323/06; C08J 2423/06; C08J 5/18

See application file for complete search history.

(56) References Cited

U.S. PATENT DOCUMENTS

| | | | |
|---|---|---|---|
| 4,076,698 | A | 2/1978 | Anderson et al. |
| 4,599,392 | A | 7/1986 | McKinney et al. |
| 5,272,236 | A | 12/1993 | Lai et al. |
| 5,278,272 | A | 1/1994 | Lai et al. |
| 5,360,648 | A * | 11/1994 | Falla ................ B32B 27/32 |
| | | | 428/35.2 |
| 5,582,923 | A | 12/1996 | Kale et al. |
| 5,733,155 | A | 3/1998 | Sagawa et al. |
| 5,854,045 | A | 12/1998 | Fang et al. |
| 6,649,548 | B1 | 11/2003 | Shawver et al. |
| 6,887,941 | B2 | 5/2005 | Zhou |
| 7,776,987 | B2 | 8/2010 | Oswald et al. |
| 2004/0168947 | A1 † | 9/2004 | McDonald |
| 2006/0177641 | A1 | 8/2006 | Breese et al. |
| 2014/0072787 | A1 | 3/2014 | Gargalaka, Jr. et al. |

FOREIGN PATENT DOCUMENTS

| | | | |
|---|---|---|---|
| WO | 2006/086133 | A1 | 8/2006 |
| WO | 2007/081548 | | 11/2007 |
| WO | 2012/106025 | † | 8/2012 |
| WO | 2012177996 | A2 | 12/2012 |

OTHER PUBLICATIONS

PCT/US2016/060931, International Preliminary Report on Patentability dated Jun. 12, 2018.

\* cited by examiner
† cited by third party

MULTILAYER POLYETHYLENE FILMS, AND ARTICLES MADE THEREFROM

TECHNICAL FIELD

Embodiments of the present disclosure generally relate to multilayer films and applications of the multilayer films to make articles, such as, for example, ultrasonically-bonded laminates.

BACKGROUND

Cloth-like backsheets have become increasingly desirable for use in hygiene absorbent products, such as, for example, diapers, adult incontinence products, and feminine hygiene articles. Cloth-like backsheets typically include a nonwoven substrate and a film laminated together, where the main objectives are to combine the key attributes of each material to provide good barrier properties (to primarily contain fluids), opacity, tensile properties, and/or haptics (e.g., softness). Depending on the lamination technology involved, the aforementioned attributes of the backsheet can vary.

Several different lamination technologies exist for joining films and nonwovens, and can include, for example, extrusion coating, hot melt adhesive, solvent-less adhesives, and ultrasonic bonding. Each lamination technique has its own particularities. In recent years, ultrasonic bonding has become an emerging lamination technology for use in producing backsheets; however, it is not without its challenges. One major challenge observed when using ultrasonic bonding is that where different types of or incompatible materials are used for the nonwoven substrate and the film, (e.g., a polyethylene-based film laminated to a polypropylene nonwoven substrate), adhesion is adversely affected often resulting in a poor bond between the two. In addition, pinholes can result which can destroy the liquid barrier functionality of the backsheet. Finally, polyethylene film has a low coefficient of friction, and therefore, may degrade or breakdown during ultrasonic bonding.

Accordingly, alternative multilayer films that can provide good adhesion to a nonwoven polypropylene substrate, and articles comprising multilayer films having good bonding, good haptics, reduced pinholes, and/or low noise may be desired.

SUMMARY

Disclosed in embodiments herein are multilayer polyethylene films. The multilayer polyethylene films comprise a core layer, a first outer layer, and a second outer layer, wherein: the core layer is positioned between the first outer layer and the second outer layer; the core layer comprises a linear low density polyethylene having a density of 0.900 g/cc to 0.935 g/cc and a melt index, I2, of 0.1 g/10 min to 10 g/10 min, and, optionally, a first low density polyethylene resin having a density from 0.915 g/cc to 0.935 g/cc and a melt index, I2, from 0.1 g/10 min to 15 g/10 min; and the first outer layer and the second outer layer independently comprise a polyethylene resin having a density of 0.930 g/cc to 0.970 g/cc and a melt index, I2, of 0.1 g/10 min to 15 g/10 min and, optionally, a second low density polyethylene resin having a density from 0.915 g/cc to 0.935 g/cc and a melt index, I2, from 0.1 g/10 min to 15 g/10 min; wherein the density of the linear low density polyethylene is less than the density of the polyethylene resin.

Also disclosed in embodiments herein are methods of manufacturing multilayer polyethylene films. The methods comprise coextruding a core layer, first outer layer, and a second outer layer to form a multilayer polyethylene film, wherein the multilayer polyethylene film comprises the core layer positioned between the first outer layer and the second outer layer; the core layer comprising a linear low density polyethylene having a density of 0.900 g/cc to 0.935 g/cc and a melt index, $I_2$, of 0.1 g/10 min to 10 g/10 min, and, optionally, a first low density polyethylene resin having a density from 0.915 g/cc to 0.935 g/cc and a melt index, $I_2$, from 0.1 g/10 min to 15 g/10 min; and the first outer layer and the second outer layer independently comprising a polyethylene resin having a density of 0.930 g/cc to 0.970 g/cc and a melt index, $I_2$, of 0.1 g/10 min to 15 g/10 min and, optionally, a second low density polyethylene resin having a density from 0.915 g/cc to 0.935 g/cc and a melt index, $I_2$, from 0.1 g/10 min to 15 g/10 min; wherein the density of the linear low density polyethylene is less than the density of the polyethylene resin.

Further disclosed in embodiments herein are ultrasonically-bonded laminates. The ultrasonically-bonded laminates comprise a multilayer polyethylene film of claims and a nonwoven substrate at least partially ultrasonically bonded to the multilayer film to form a laminate. The multilayer polyethylene films comprise a core layer, a first outer layer, and a second outer layer, wherein: the core layer is positioned between the first outer layer and the second outer layer; the core layer comprises a linear low density polyethylene having a density of 0.900 g/cc to 0.935 g/cc and a melt index, I2, of 0.1 g/10 min to 10 g/10 min, and, optionally, a first low density polyethylene resin having a density from 0.915 g/cc to 0.935 g/cc and a melt index, I2, from 0.1 g/10 min to 15 g/10 min; and the first outer layer and the second outer layer independently comprise a polyethylene resin having a density of 0.930 g/cc to 0.970 g/cc and a melt index, I2, of 0.1 g/10 min to 15 g/10 min and, optionally, a second low density polyethylene resin having a density from 0.915 g/cc to 0.935 g/cc and a melt index, I2, from 0.1 g/10 min to 15 g/10 min; wherein the density of the linear low density polyethylene is less than the density of the polyethylene resin.

Additional features and advantages of the embodiments will be set forth in the detailed description which follows, and in part will be readily apparent to those skilled in the art from that description or recognized by practicing the embodiments described herein, including the detailed description and examples, as well as, the appended drawings.

It is to be understood that both the foregoing and the following description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Reference will now be made in detail to embodiments of multilayer films and ultrasonically-bonded laminates, examples of which are further described in the accompanying figures. The multilayer films may be used to produce cloth-like backsheets. It is noted, however, that this is merely an illustrative implementation of the embodiments disclosed herein. The embodiments are applicable to other technologies that are susceptible to similar problems as those discussed above. For example, multilayer films used to produce cloth-like wipes, face masks, surgical gowns, tissues, bandages and wound dressings are clearly within the purview of the present embodiments. As used herein, "multilayer film" refers to a film having two or more layers that are at least partially contiguous and preferably, but optionally, coextensive.

In embodiments herein, the multilayer films may be polyethylene-based. As used herein in reference to multilayer films, "polyethylene-based" means that the multilayer films are primarily (i.e., greater than 50%, by total weight of the multilayer film) comprised of polyethylene resin. "Polyethylene" refers to a homopolymer of ethylene or a copolymer of ethylene with one or more comonomers with a majority of its polymer units derived from ethylene. Also disclosed herein are ultrasonically-bonded laminates comprising the multilayer films.

The multilayer films comprise a core layer, a first outer layer, and a second outer layer. The first outer layer and the second outer layer do not contain any nonwoven materials. The core layer is positioned between the first outer layer and the second outer layer. In an embodiment, the core layer may comprise two or more layers, three or more layers, or even five or more layers.

In some embodiments, the multilayer films may comprise one or more additional layers, such as structural, barrier, or tie layers, positioned between the core layer and each outer layer. Various materials can be used for these layers and can include chlorinated polyethylene, ethylene-alpha-olefin block copolymers, ultra low density polyethylene ("ULDPE"), linear low density polyethylene ("LLDPE"), high density polyethylene ("HDPE"), medium density polyethylene ("MDPE"), linear medium density polyethylene ("LMDPE"), low density polyethylene ("LDPE"), ionomers, and graft-modified polyethylene (e.g., maleic anhydride grafted polyethylene).

The thickness ratio of the core layer to the first outer layer and the second outer layer can be a ratio suitable to impart good ultrasonic bonding properties to the film. In some embodiments, the thickness ratio of the core layer to the first outer layer and the second outer layer may be 50:50 to 90:10. In other embodiments, the thickness ratio of the core layer to the first outer layer and the second outer layer may be 60:40 to 90:10. In further embodiments, the thickness ratio of the core layer to the first outer layer and the second outer layer may be 60:40 to 85:15. The thickness ratio of the core layer to the first outer layer and the second outer layer can also be captured by percentages. For example, in some embodiments, the core layer comprises greater than 50% to 90% of the overall film thickness. In other embodiments, the core layer comprises from 60% to 85% of the overall film thickness. In further embodiments, the core layer comprises from 65% to 80% of the overall film thickness. In embodiments herein, the first outer layer has the same thickness as the second outer layer. Alternatively, the first outer layer has a different thickness as the second outer layer.

Core Layer

The core layer comprises a linear low density polyethylene ("LLDPE"). The LLDPE includes linear or substantially linear polyethylene polymers produced by the copolymerization of an ethylene monomer and one or more alpha-olefin comonomers, and characterized by a density of from 0.900 to 0.935 g/cc. The resulting polymer includes a significant number of short chain branches. The LLDPE comprises greater than 50%, by weight, of its units derived from the ethylene monomer, for example, at least 60%, at least 70%, at least 80%, at least 90%, at least 92%, at least 95%, at least 97%, by weight, of the units derived from the ethylene monomer; and less than 30%, for example, less than 25%, less than 20%, less than 15%, less than 10%, less than 5%, less than 3%, by weight, of units derived from the one or more alpha-olefin comonomers.

Suitable alpha-olefin comonomers include a C4-C20 alpha-olefin, a C4-C12 alpha-olefin, a C3-C10 alpha-olefin, a C3-C8 alpha-olefin, a C4-C8 alpha-olefin, or a C6-C8 alpha-olefin. In some embodiments, the alpha-olefin is selected from the group consisting of propylene, 1-butene, 1-pentene, 1-hexene, 4-methyl-1-pentene, 1-heptene, 1-octene, 1-nonene and 1-decene. In other embodiments, the alpha-olefin is selected from the group consisting of propylene, 1-butene, 1-hexene, and 1-octene. In further embodiments, the alpha-olefin is selected from the group consisting of 1-hexene and 1-octene. In even further embodiments, the ethylene-based polymer is an ethylene/α-olefin copolymer, wherein the alpha-olefin is 1-octene.

"LLDPE" may be made using chromium, Ziegler-Natta, metallocene, constrained geometry, or single site catalysts. The term "LLDPE" includes znLLDPE, uLLDPE, and mLLDPE. "znLLDPE" refers to linear polyethylene made using a Ziegler-Natta catalyst, "uLLDPE" or "ultra linear low density polyethylene" refers to linear polyethylene. "mLLDPE" refers to LLDPE made using metallocene, constrained geometry, or single site catalysts. The LLDPE can be made via gas-phase, solution-phase, or slurry polymerization processes, or any combination thereof, using any type of reactor or reactor configuration known in the art, e.g., fluidized bed gas phase reactors, loop reactors, stirred tank reactors, batch reactors in parallel, series, and/or any combinations thereof. In some embodiments, gas or slurry phase reactors are used.

Other examples of suitable LLDPEs are further defined in U.S. Pat. No. 5,272,236, U.S. Pat. No. 5,278,272, U.S. Pat. No. 5,582,923 and U.S. Pat. No. 5,733,155, which include substantially linear low density polyethylenes; homogeneously branched linear ethylene polymer compositions, such as those in U.S. Pat. No. 3,645,992; heterogeneously branched ethylene polymers, such as those prepared according to the process disclosed in U.S. Pat. No. 4,076,698; and/or blends thereof (such as those disclosed in U.S. Pat. No. 3,914,342 or U.S. Pat. No. 5,854,045). In some embodiments, the linear low density (LLDPE) polymer or substantially LLDPE polymer may include AFFINITY™ resins, ELITE™ resins, or ATTANE™ resins sold by The Dow Chemical Company, including ELITE™ 5230G resin, ATTANE™ 4404 resin, ATTANE™ 4202 resin, or AFFINITY™ 1840 resin; DOWLEX™ 2247 resin; EXCEED™ resins sold by Exxon Mobil Corporation, including EXCEED™ 3518 resin or EXCEED™ 4518 resin; and EXACT™ resins sold by Exxon Mobil Corporation, including EXACT™ 3024. In one embodiment, the LLDPE is a Ziegler-Natta catalyzed ethylene and alpha-olefin copolymer, having a density from about 0.900 g/cc to about 0.935 g/cc. In another embodiment, the LLDPE is a single-site catalyzed ethylene and alpha-olefin copolymer, having a density from about 0.900 g/cc to about 0.935 g/cc.

The LLDPE has a density in the range of from about 0.900 to 0.935 g/cc. All individual values and subranges from 0.900-0.935 g/cc are included and disclosed herein. For example, in some embodiments, the LLDPE has a density of 0.905-0.925 g/cc. In other embodiments, the LLDPE has a density of 0.915-0.930 g/cc. In further embodiments, the LLDPE has a density of 0.915-0.925 g/cc. Densities disclosed herein are determined according to ASTM D-792. In embodiments herein, the density of the linear low density polyethylene is less than the density of the polyethylene resin described below.

The LLDPE has a melt index of about 0.1-10 g/10 min. All individual values and subranges from 0.1-10 g/10 min are included and disclosed herein. For example, in some embodiments, the LLDPE has a melt index of 0.1-8 or 0.1-6 g/10 min. In other embodiments, the LLDPE has a melt index of 0.5-6 or 0.5-5 g/10 min. In further embodiments, the LLDPE has a melt index of 1-5 g/10 min. Melt index, or $I_2$, for ethylene-based polymers is determined according to ASTM D1238 at 190° C., 2.16 kg.

The LLDPE has a polymer backbone that lacks measurable or demonstrable long chain branches. As used herein, "long chain branching" means branches having a chain length greater than that of any short chain branches, which are a result of comonomer incorporation. The long chain branch can be about the same length or as long as the length of the polymer backbone. In some embodiments, the ethylene-based polymer is substituted with an average of from 0.01 long chain branches/1000 carbons to 3 long chain branches/1000 carbons, from 0.01 long chain branches/1000 carbons to 1 long chain branches/1000 carbons, from 0.05 long chain branches/1000 carbons to 1 long chain branches/1000 carbons. In other embodiments, the ethylene-based polymer is substituted with an average of less than 1 long chain branches/1000 carbons, less than 0.5 long chain branches/1000 carbons, or less than 0.05 long chain branches/1000 carbons, or less than 0.01 long chain branches/1000 carbons. Long chain branching (LCB) can be determined by conventional techniques known in the industry, such as $^{13}C$ nuclear magnetic resonance ($^{13}C$ NMR) spectroscopy, and can be quantified using, for example, the method of Randall (Rev. Macromol. Chem. Phys., C29 (2 & 3), p. 285-297). Two other methods that may be used include gel permeation chromatography coupled with a low angle laser light scattering detector (GPC-LALLS), and gel permeation chromatography coupled with a differential viscometer detector (GPC-DV). The use of these techniques for long chain branch detection, and the underlying theories, have been well documented in the literature. See, for example, Zimm, B. H. and Stockmayer, W. H., J. Chem. Phys., 17, 1301 (1949) and Rudin A., Modern Methods of Polymer Characterization, John Wiley & Sons, New York (1991), pp. 103-112.

In embodiments herein, the LLDPE comprises at least 50 wt. % of the core layer, based on the total weight of polymers present in the core layer. In some embodiments, the LLDPE may comprise at least 55 wt. % of the core layer, at least 60 wt. % of the core layer, at least 65 wt. % of the core layer, at least 70 wt. % of the core layer, at least 75 wt. % of the core layer, at least 80 wt. % of the core layer, at least 85 wt. % of the core layer, at least 90 wt. % of the core layer, at least 95 wt. % of the core layer, at least 99 wt. % of the core layer, or 100 wt. % of the core layer, based on the total weight of polymers present in the core layer.

In embodiments herein, the core layer may further comprise an optional first low density polyethylene (first LDPE). The core layer may comprise from 0 to 40 wt. %, based on the total weight of polymers present in the core layer, of a first LDPE. All individual values and subranges from 0 to 40 wt. % are included and disclosed herein. For example, in some embodiments, the core layer may further comprise from 5 to 40 wt. %, based on the total weight of polymers present in the core layer, of a first LDPE. In other embodiments, the core layer may further comprise from 5 to 30 wt. %, based on the total weight of polymers present in the core layer, of a first LDPE. In further, embodiments, the core layer may further comprise from 5 to 25 wt. %, based on the total weight of polymers present in the core layer, of a first LDPE.

In embodiments herein, the optional first LDPE present in the core layer may have a density of about 0.915-0.935 g/cc. All individual values and subranges from 0.915-0.930 g/cc are included and disclosed herein. For example, in some embodiments, the first LDPE has a density of 0.915-0.925 g/cc. In other embodiments, the first LDPE has a density of 0.915-0.920 g/cc. In embodiments herein, the optional first LDPE present in the core layer may have a melt index of 0.1-15 g/10 min. All individual values and subranges from 0.1-15 g/10 min are included and disclosed herein. For example, in some embodiments, the first LDPE has a melt index of 1-12 g/10 min, or 2 to 12 g/10 min. In other embodiments, the first LDPE has a melt index of 2-10 g/10 min.

The optional first LDPE present in the core layer may have a melt strength of greater than 5 cN. All individual values and subranges of greater than 5 cN are included and disclosed herein. For example, in some embodiments, the optional first LDPE has a melt strength of from 6-25 cN. In other embodiments, the optional first LDPE has a melt strength of from 6-24, 6-22, 6-20, 6-18, 6-16, or 6-14 cN. In further embodiments, the optional first LDPE has a melt strength of from 6-12 cN. In further embodiments, the optional first LDPE has a melt strength of from 6-10 cN. In even further embodiments, the optional first LDPE has a melt strength of from 6-8 cN.

The optional first LDPE may include branched interpolymers that are partly or entirely homopolymerized or copolymerized in autoclave or tubular reactors at pressures above 14,500 psi (100 MPa) with the use of free-radical initiators, such as peroxides (see, for example U.S. Pat. No. 4,599,392, which is herein incorporated by reference). Examples of suitable optional first LDPEs may include, but are not limited to, ethylene homopolymers, and high pressure copolymers, including ethylene interpolymerized with, for example, vinyl acetate, ethyl acrylate, butyl acrylate, acrylic acid, methacrylic acid, carbon monoxide, or combinations thereof. Exemplary optional first LDPE resins may include resins sold by The Dow Chemical Company, such as, AGILITY™ 1000, LDPE 722, LDPE 5004, and LDPE 621i. Other exemplary LDPE resins are described in WO 2005/023912, which is herein incorporated by reference.

The core layer may optionally comprise one or more additives. Such additives may include, but are not limited to, antioxidants (e.g., hindered phenolics, such as, IRGANOX® 1010 or IRGANOX® 1076, supplied by Ciba Geigy), phosphites (e.g., IRGAFOS® 168, also supplied by Ciba Geigy), cling additives (e.g., PIB (polyisobutylene)), Standostab PEPQ™ (supplied by Sandoz), pigments, colorants, fillers (e.g., calcium carbonate, talc, mica, kaolin, perlite, diatomaceous earth, dolomite, magnesium carbonate, calcium sulfate, barium sulfate, glass beads, polymeric beads, ceramic beads, natural and synthetic silica, aluminum trihydroxide, magnesium trihydroxide, wollastonite, whiskers, wood flour, lignine, starch), $TiO_2$, anti-stat additives, flame retardants, biocides, antimicrobial agents, and clarifiers/nucleators (e.g., HYPERFORM™ HPN-20E, MILLAD™ 3988, MILLAD™ NX 8000, available from Milliken Chemical). The one or more additives can be included in the LLDPE at levels typically used in the art to achieve their desired purpose. In some examples, the one or more additives are included in amounts ranging from 0-10 wt. % of the LLDPE, 0-5 wt. % of the LLDPE, 0.001-5 wt. % of the LLDPE, 0.001-3 wt. % of the LLDPE, 0.05-3 wt. % of the LLDPE, or 0.05-2 wt. % of the LLDPE.

Outer Layers

The first outer layer and the second outer layer do not contain non-woven materials. The first outer layer and the second outer layer independently comprise a polyethylene resin. In embodiments herein, the first outer layer may have the same composition as the second outer layer or the first outer layer may have a different composition as the second outer layer. The polyethylene resin may be an ethylene homopolymer, ethylene/α-olefin interpolymer, or an ethylene/alpha-olefin copolymer. As used herein, "interpolymer" refers to polymers prepared by the polymerization of at least two different types of monomers. The term "interpolymer" can include copolymers, which is used to refer to polymers prepared from two different types of monomers, and polymers prepared from more than two different types of monomers. The term "ethylene/α-olefin interpolymer" refers to an ethylene-based polymer that comprises, in polymerized form, a majority weight percent ethylene (based on the weight of interpolymer), an α-olefin comonomer, and optionally, one or more additional comonomers.

The polyethylene resin may be homogeneously branched or heterogeneously branched. Homogeneously branched polymers may be produced, for example, by single-site, metallocene, or constrained geometry catalyst systems and contain a substantially homogeneous distribution of comonomer among the molecules of the interpolymer. Heterogeneously branched polymers may be produced by, for example, Ziegler-Natta or chromium type catalysts, and contain a non-homogeneous distribution of comonomer among the molecules of the polymer. The comonomer may be an α-olefin. The polyethylene resin comprises greater than 50%, by weight, of its units derived from the ethylene monomer, for example, at least 60%, at least 70%, at least 80%, at least 90%, at least 92%, at least 95%, at least 97%, at least 99%, at least 99.5%, by weight, of the units derived from the ethylene monomer; and less than 30%, for example, less than 25%, less than 20%, less than 15%, less than 10%, less than 5%, less than 3%, less than 1%, less than 0.5%, by weight, of units derived from the one or more alpha-olefin comonomers.

Suitable alpha-olefin comonomers include a C4-C20 alpha-olefin, a C4-C12 alpha-olefin, a C3-C10 alpha-olefin, a C3-C8 alpha-olefin, a C4-C8 alpha-olefin, or a C6-C8 alpha-olefin. In some embodiments, the alpha-olefin is selected from the group consisting of propylene, 1-butene, 1-pentene, 1-hexene, 4-methyl-1-pentene, 1-heptene, 1-octene, 1-nonene and 1-decene. In other embodiments, the alpha-olefin is selected from the group consisting of propylene, 1-butene, 1-hexene, and 1-octene. In further embodiments, the alpha-olefin is selected from the group consisting of 1-hexene and 1-octene.

In some embodiments, the polyethylene resin is an ethylene homopolymer. In other embodiments, the polyethylene resin is an ethylene/alpha-olefin copolymer. In embodiments herein, the polyethylene resin may be bimodal or monomodal. Where the molecular weight distribution of the polyethylene resin has 2 peaks on a gel permeation chromatography curve, or when the molecular weight distribution of the polyethylene resin is distinctly broadened when compared to curves for individual fractions (where the individual fractions are prepared in separate reactors), then it is considered to be a bimodal resin. Where the molecular weight distribution of the polyethylene resin has 1 peak on a gel permeation chromatography curve, then it is considered to be a monomodal resin.

In embodiments herein, the polyethylene resin may have a density of about 0.930-0.970 g/cc. All individual values and subranges from 0.930-0.970 g/cc are included and disclosed herein. For example, in some embodiments, the polyethylene resin has a density of 0.935-0.970 g/cc. In other embodiments, the polyethylene resin has a density of 0.935-0.965 g/cc. In further embodiments, the polyethylene resin has a density of 0.935-0.960 g/cc. In even further embodiments, the polyethylene resin has a density from a lower limit of 0.935, 0.937, 0.940, 0.945, 0.947, or 0.950 to an upper limit of 0.970, 0.967, 0.965, 0.962, 0.960, 0.957, 0.955, 0.952, or 0.950. In embodiments herein, the density of the polyethylene resin is greater than the density of the linear low density polyethylene.

In embodiments herein, the polyethylene resin may have a melt index of 0.1-15 g/10 min. All individual values and subranges from 0.1-15 g/10 min are included and disclosed herein. For example, in some embodiments, the polyethylene resin has a melt index of 1-12 g/10 min. In other embodiments, the polyethylene resin has a melt index of 2-10 g/10 min. In further embodiments, the polyethylene resin has a melt index of 3-9 g/10 min.

The polyethylene resin may be produced in various commercially available continuous reaction processes, particularly, those comprising two or more individual reactors in series or parallel using slurry, solution or gas phase process technology or hybrid reaction systems (e.g. combination of slurry and gas phase reactor). Exemplary processes may be found in U.S. Pat. No. 4,076,698, which is herein incorporated by reference. Alternatively, the polyethylene resin may also be produced by offline blending of 2 or more different polyethylene resins. For example, in some embodiments, the polyethylene resin may be a conventional mono-modal Ziegler-Natta MDPE or HDPE blended with a multi-modal Ziegler-Natta MDPE or HDPE. It is contemplated, however, that the polyethylene resin can be produced with alternative catalyst systems, such as, metallocene, post-metallocene or chromium-based catalysts. Exemplary polyethylene resins may include resins sold by The Dow Chemical Company under the trade name HDPE 5962B, DMDA 8007 NT 7, AGILITY™ 6047G and DOWLEX™ 2027G.

In embodiments herein, the polyethylene resin independently comprises at least 50 wt. % of the first outer layer, based on the total weight of polymers present in the first outer layer. In some embodiments, the polyethylene resin may comprise at least 55 wt. % of first outer layer, at least 60 wt. % of the first outer layer, at least 65 wt. % of the first outer layer, at least 70 wt. % of the first outer layer, at least 75 wt. % of the first outer layer, at least 80 wt. % of the first outer layer, at least 85 wt. % of the first outer layer, at least 90 wt. % of the first outer layer, at least 95 wt. % of the first outer layer, at least 99 wt. % of the first outer layer, or 100 wt. % of the first outer layer, based on the total weight of polymers present in the first outer layer.

In embodiments herein, the polyethylene resin independently comprises at least 50 wt. % of the second outer layer, based on the total weight of polymers present in the second outer layer. In some embodiments, the polyethylene resin may comprise at least 55 wt. % of second outer layer, at least 60 wt. % of the second outer layer, at least 65 wt. % of the second outer layer, at least 70 wt. % of the second outer layer, at least 75 wt. % of the second outer layer, at least 80 wt. % of the second outer layer, at least 85 wt. % of the second outer layer, at least 90 wt. % of the second outer layer, at least 95 wt. % of the second outer layer, at least 99 wt. % of the second outer layer, or 100 wt. % of the second outer layer, based on the total weight of polymers present in the second outer layer.

In embodiments herein, the first outer layer and/or the second outer layer may further independently comprise an optional second low density polyethylene (second LDPE). That is, in embodiments herein, the first outer layer may comprise an optional second LDPE, the second outer layer may comprise an optional second LDPE, or the first outer layer and the second outer layer may comprise an optional second LDPE. The first outer layer may independently comprise from 0 to 40 wt. %, based on the total weight of polymers present in the first outer layer, of a second LDPE. All individual values and subranges from 0 to 40 wt. % are included and disclosed herein. For example, in some embodiments, the first outer layer may further comprise from 5 to 40 wt. %, based on the total weight of polymers present in the first outer layer, of a second LDPE. In other embodiments, the first outer layer may further comprise from 5 to 30 wt. %, based on the total weight of polymers present in the first outer layer of a second LDPE. In further, embodiments, the first outer layer may further comprise from 5 to 25 wt. %, based on the total weight of polymers present in the first outer layer, of a second LDPE.

The second outer layer may also independently comprise from 0 to 40 wt. %, based on the total weight of polymers present in the second outer layer, of a second LDPE. All individual values and subranges from 0 to 40 wt. % are included and disclosed herein. For example, in some embodiments, the second outer layer may further comprise from 5 to 40 wt. %, based on the total weight of polymers present in the second outer layer, of a second LDPE. In other embodiments, the second outer layer may further comprise from 5 to 30 wt. %, based on the total weight of polymers present in the second outer layer of a second LDPE. In further, embodiments, the second outer layer may further comprise from 5 to 25 wt. %, based on the total weight of polymers present in the second outer layer, of a second LDPE. Where the optional second LDPE is present in both the first outer layer and the second outer layer, then the first outer layer may independently comprise 0 to 40 wt. % of the second LDPE and the second outer layer may independently comprise 0 to 40 wt. % of the second LDPE as described above.

In embodiments herein, the optional second LDPE present in the first outer layer and/or the second outer layer may have a density of about 0.915-0.935 g/cc. All individual values and subranges from 0.915-0.930 g/cc are included and disclosed herein. For example, in some embodiments, the second LDPE has a density of 0.915-0.925 g/cc. In other embodiments, the second LDPE has a density of 0.915-0.920 g/cc. In embodiments herein, the optional second LDPE present in the first outer layer and/or the second outer layer may have a melt index of 0.1-15 g/10 min. All individual values and subranges from 0.1-15 g/10 min are included and disclosed herein. For example, in some embodiments, the second LDPE has a melt index of 1-12 g/10 min, or 2 to 12 g/10 min. In other embodiments, the second LDPE has a melt index of 2-10 g/10 min.

The optional second LDPE present in the core layer may have a melt strength of greater than 5 cN. All individual values and subranges of greater than 5 cN are included and disclosed herein. For example, in some embodiments, the optional second LDPE has a melt strength of from 6-25 cN. In other embodiments, the optional second LDPE has a melt strength of from 6-24, 6-22, 6-20, 6-18, 6-16, or 6-14 cN. In further embodiments, the optional second LDPE has a melt strength of from 6-12 cN. In further embodiments, the optional second LDPE has a melt strength of from 6-10 cN. In even further embodiments, the optional second LDPE has a melt strength of from 6-8 cN.

The optional second LDPE may include branched interpolymers that are partly or entirely homopolymerized or copolymerized in autoclave or tubular reactors at pressures above 14,500 psi (100 MPa) with the use of free-radical initiators, such as peroxides (see for example U.S. Pat. No. 4,599,392, incorporated herein by reference). Examples of suitable optional second LDPEs present in the first outer layer and/or the second outer layer may include, but are not limited to, ethylene homopolymers, and high pressure copolymers, including ethylene interpolymerized with, for example, vinyl acetate, ethyl acrylate, butyl acrylate, acrylic acid, methacrylic acid, carbon monoxide, or combinations thereof. Exemplary LDPE resins may include resins sold by The Dow Chemical Company, such as, LDPE 722, LDPE 5004, and LDPE 621i. Other exemplary LDPE resins are described in WO 2005/023912, which is herein incorporated by reference.

The first outer layer and the second outer layer may independently comprise one or more additives. Such additives may include, but are not limited to, antioxidants (e.g., hindered phenolics, such as, IRGANOX® 1010 or IRGANOX® 1076, supplied by Ciba Geigy), phosphites (e.g., IRGAFOS® 168, also supplied by Ciba Geigy), cling additives (e.g., PIB (polyisobutylene)), Standostab PEPQ™ (supplied by Sandoz), pigments, colorants, fillers (e.g., calcium carbonate, mica, talc, kaolin, perlite, diatomaceous earth, dolomite, magnesium carbonate, calcium sulfate, barium sulfate, glass beads, polymeric beads, ceramic beads, natural and synthetic silica, aluminum trihydroxide, magnesium trihydroxide, wollastonite, whiskers, wood flour, lignine, starch), $TiO_2$, anti-stat additives, flame retardants, slip agents, antiblock additives, biocides, antimicrobial agents, and clarifiers/nucleators (e.g., HYPERFORM™ HPN-20E, MILLAD™ 3988, MILLAD™ NX 8000, available from Milliken Chemical). The one or more additives can be included in the first outer layer and the second outer layer at levels typically used in the art to achieve their desired purpose. In some examples, the one or more additives are included in amounts ranging from 0-10 wt. % of the first outer layer and/or the second outer layer, 0-5 wt. % of the first outer layer and/or the second outer layer, 0.001-5 wt. % of the first outer layer and/or the second outer layer, 0.001-3 wt. % of the first outer layer and/or the second outer layer, 0.05-3 wt. % of the first outer layer and/or the second outer layer, or 0.05-2 wt. % of the first outer layer and/or the second outer layer.

Multilayer Polyethylene Films

The multilayer polyethylene films described herein may be coextruded films. In some embodiments, the multilayer polyethylene film is a coextruded film, whereby at least one of the outer layers is coextruded to the core layer. In other embodiments, the multilayer polyethylene film is a coextruded film, whereby one of the outer layers (i.e., the first outer layer) is coextruded to the core layer and the other outer layer (i.e., the second outer layer) is coextruded to the core layer, and the two coextruded films are laminated together such that the core layer is positioned between the first outer layer and the second outer layer. In further embodiments, the multilayer polyethylene film is a coextruded film, whereby the first outer layer and the second outer layer are coextruded to the core layer. In some embodiments herein a method of manufacturing the multilayer polyethylene film comprises coextruding a core layer, a first outer layer, and a second outer layer to form a multilayer polyethylene film as described herein.

Films may be made via any number of processes including cast film where the polymer is extruder through a flat die to create a flat film or blown film whereby the polymer is extruded through an annular die and creates a tube of film that can be slit to create the flat film.

In embodiments herein, the multilayer polyethylene film may have a basis weight of between about 10-25 gsm. All individual values and subranges from 10-25 gsm are included and disclosed herein. For example, in some embodiments, the multilayer polyethylene film may have a basis weight of between about 10-23, 10-21, 10-20, or 10-18 gsm. In other embodiments, the multilayer polyethylene film may have a basis weight of between about 10-16 gsm. In further embodiments, the multilayer polyethylene film may have a basis weight of between about 10-14 gsm.

Laminates

Also described herein are ultrasonically-bonded laminates. The ultrasonically-bonded laminates comprise a multilayer polyethylene film as previously described herein, and a nonwoven substrate at least partially ultrasonically bonded to the multilayer polyethylene film to form a laminate. As used herein, "nonwoven substrates" include nonwoven webs, nonwoven fabrics and any nonwoven structure in which individual fibers or threads are interlaid, but not in a regular or repeating manner Nonwoven substrates described herein may be formed by a variety of processes, such as, for example, air laying processes, meltblowing processes, spunbonding processes and carding processes, including bonded carded web processes. As used herein, "ultrasonic bonding" includes ultrasonic welding.

The nonwoven web may comprise a single web, such as a spunbond web, a carded web, an airlaid web, a spunlaced web, or a meltblown web. However, because of the relative strengths and weaknesses associated with the different processes and materials used to make nonwoven fabrics, composite structures of more than one layer are often used in order to achieve a better balance of properties. Such structures are often identified by letters designating the various lays such as SM for a two layer structure consisting of a spunbond layer and a meltblown layer, SMS for a three layer structure, or more generically $SX_nS$ structures, where X can be independently a spunbond layer, a carded layer, an airlaid layer, a spunlaced layer, or a meltblown layer and n can be any number, although for practical purposes is generally less than 5. In order to maintain structural integrity of such composite structures, the layers must be bonded together. Common methods of bonding include point bonding, adhesive lamination, and other methods known to those skilled in the art. All of these structures may be used in the present invention. The fibers which make up the nonwoven web may be monocomponent or bicomponent fibers.

In embodiments herein, the nonwoven substrate may be formed from a propylene-based material, 100% polyethylene, or polyethylene/polypropylene blends. Examples of suitable propylene-based materials include materials that comprise a majority weight percent of polymerized propylene monomer (based on the total amount of polymerizable monomers), and optionally, one or more comonomers. This may include propylene homopolymer (i.e., a polypropylene), a propylene copolymer, or combinations thereof. The propylene copolymer may be a propylene/olefin copolymer. Nonlimiting examples of suitable olefin comonomers include ethylene, $C_4$-$C_{20}$ α-olefins, such as 1-butene, 1-pentene, 1-hexene, 4-methyl-1-pentene, 1-heptene, 1-octene, 1-decene, or 1-dodecene. In some embodiments, the nonwoven substrate is formed from a polypropylene resin.

As previously mentioned, the nonwoven substrate may comprise one or more layers. In some embodiments, the nonwoven substrate comprises at least one spunbond layer (S) and at least one meltblown layer (M). In other embodiments, the nonwoven substrate comprises at least one spunbond layer (S) or at least one meltblown layer (M), and may have one of the following structures: SSS, SM, SMS, SMMS, SSMMS, or SSMMMS. The outermost spunbond layer may comprise a material selected from the group consisting of spunbond homopolymer polypropylene (hPP), spunbond heterogeneously branched polyethylene, or carded hPP.

The ultrasonically-bonded laminates described herein may exhibit a peel strength of greater than about 0.5 lb$_f$/in.

End Uses

The films or ultra-sonically bonded laminates described herein may be used in a variety of applications. In some embodiments, the films or laminates can be used in hygiene applications, such as diapers, training pants, and adult incontinence articles, or in other similar absorbent garment applications. In other embodiments, the films or laminates can be used in medical applications, such as medical drapes, gowns, and surgical suits, or in other similar fabric (woven or nonwoven) applications.

The films or laminates may be breathable or non-breathable. As used herein, the term "breathable" refers to a material which is permeable to water vapor. The water vapor transmission rate (WVTR) or moisture vapor transfer rate (MVTR) is measured in grams per square meter per 24 hours, and shall be considered equivalent indicators of breathability. The term "breathable" refers to a material which is permeable to water vapor having a minimum WVTR (water vapor transmission rate) of greater than about 100 g/m$^2$/24 hours. In some embodiments, the breathability is greater than about 300 g/m$^2$/24 hours. In other embodiments, the breathability is greater than about 500 g/m$^2$/24 hours. In further embodiments, the breathability is greater than about 1000 g/m$^2$/24 hours.

The WVTR of films or laminates, in one aspect, gives an indication of how comfortable the article would be to wear. Often, hygiene applications of breathable films or laminates desirably have higher WVTRs and films or laminates of the present invention can have WVTRs exceeding about 1,200 g/m$^2$/24 hours, 1,500 g/m$^2$/24 hours, 1,800 g/m$^2$/24 hours or even exceeding 2,000 g/m$^2$/24 hours. A suitable technique for determining the WVTR (water vapor transmission rate) value of a film or laminate material of the invention is the test procedure standardized by INDA (Association of the Nonwoven Fabrics Industry), number IST-70.4-99, entitled "STANDARD TEST METHOD FOR WATER VAPOR TRANSMISSION RATE THROUGH NONWOVEN AND PLASTIC FILM USING A GUARD FILM AND VAPOR PRESSURE SENSOR" which is incorporated by reference herein. The INDA procedure provides for the determination of WVTR, the permanence of the film to water vapor and, for homogeneous materials, water vapor permeability coefficient.

Breathable films may be obtained by adding fillers, like $CaCO_3$, clay, silica, alumina, talc, etc., to make moisture breathable films of high WVTR, which requires a post-orientation process, such as machine direction orientation or the use of inter-digitating or inter-meshing rollers, also called "ring rolling", to create cavitation around the filler particles (see, for example, WO2007/081548 or WO1998/004397, which are herein incorporated by reference). Enhanced moisture permeation in such films is a result of microporous morphology. Such films are commonly used hygiene applications for diaper and adult incontinence backsheet films and in medical applications such as breathable but liquid impermeable surgical gowns and can yield WVTR values of greater than 500 $g/m^2/24$ hours up to 20,000 $g/m^2/24$ hours, depending upon the level of $CaCO_3$ and stretching, for films ranging in thickness from 0.2 to 1.5 mils thickness.

Test Methods

Unless otherwise stated, the following test methods are used. All test methods are current as of the filing date of this disclosure.

Density

Densities disclosed herein for ethylene-based and propylene-based polymers are determined according to ASTM D-792.

Melt Index

Melt index, or $I_2$, for ethylene-based polymers is determined according to ASTM D1238 at 190° C., 2.16 kg.

Melt Flow Rate

Melt Flow Rate, or MFR, for propylene-based polymers is measured in accordance with ASTM D1238 at 230° C., 2.16 kg.

Melt Strength

Melt Strength measurements are conducted on a Gottfert Rheotens 71.97 (Göettfert Inc.; Rock Hill, S.C.) attached to a Gottfert Rheotester 2000 capillary rheometer. A polymer melt (about 20-30 grams, pellets) is extruded through a capillary die with a flat entrance angle (180 degrees) with a capillary diameter of 2.0 mm and an aspect ratio (capillary length/capillary diameter) of 15. After equilibrating the samples at 190° C. for 10 minutes, the piston is run at a constant piston speed of 0.265 mm/second. The standard test temperature is 190° C. The sample is drawn uniaxially to a set of accelerating nips located 100 mm below the die, with an acceleration of 2.4 mm/second2. The tensile force is recorded as a function of the take-up speed of the nip rolls. Melt strength is reported as the plateau force (cN) before a strand breaks. The following conditions are used in the melt strength measurements: plunger speed=0.265 mm/second; wheel acceleration=2.4 mm/s2; capillary diameter=2.0 mm; capillary length=30 mm; and barrel diameter=12 mm.

2% Secant Modulus/Stress at Break

Tensile properties, including the secant modulus at 2% strain and the stress at break, are determined in the machine and cross directions according to ASTM D882.

Spencer Dart Impact Strength

The Spencer dart impact test is determined according to ASTM D3420, Procedure B.

Peel Strength

Films are ultrasonically bonded to a nonwoven to form a laminate. The specimen size is 127 mm×25.4 mm Five specimens are measured per laminate. Peel force is determined by separating the film from a nonwoven substrate, and is a measure of the energy required to separate the layers per unit area. At a first end of the specimen, one inch of the film is manually separated from the nonwoven substrate to form a starting gap. The film is placed in the movable grip of a CRE tensile testing machine (Instron) while the nonwoven substrate is placed in a stationary 180° plane. The films are peeled from the nonwoven substrate at a rate of about 304.8 mm/min.

Puncture Resistance

Puncture is measured on a tensile testing machine according to ASTM D5748, except for the following: square specimens are cut from a sheet to a size of 6 inches by 6 inches; the specimen is clamped in a 4 inch diameter circular specimen holder and a puncture probe is pushed into the center of the clamped film at a cross head speed of 10 inches/minute; the probe is a 0.5 inch diameter polished steel ball on a 0.25 inch support rod; there is a 7.7 inch maximum travel length to prevent damage to the test fixture; there is no gauge length—prior to testing, the probe is as close as possible to, but not touching, the specimen. A single thickness measurement is made in the center of the specimen. A total of five specimens are tested to determine an average puncture value.

Examples

The embodiments described herein may be further illustrated by the following non-limiting examples.

Three layer films were made as outlined below. The films were produced on a three layer Colin cast line having a maximum line speed of 20 m/min, a melt temperature of 230° C., a die temp of 230° C., a die gap of 0.8 mils, and an air gap of 8 in. The multilayer films have a basis weight of 25 gsm. The core layer comprises 70% of the overall film thickness. Each outer layer comprises 15% of the overall film thickness.

Resins Used

The following resins: a low density polyethylene (LDPE) is a high pressure low density polyethylene made in an autoclave reactor having has a density of 0.918 g/cc and a melt index of 8.0 g/10 min (LDPE 722 from The Dow Chemical Company, USA); a linear low density polyethylene 1 ("LLDPE 1") having a density of 0.917 g/cc and a melt index of 2.3 g/10 min (DOWLEX™ 2247 from The Dow Chemical Company, USA); a linear low density polyethylene 2 ("LLDPE 2") having a density of 0.916 g/cc and a melt index of 4.0 g/10 min (ELITE™ 5230 from The Dow Chemical Company, USA); a polyethylene resin having a density of 0.947 g/cc and a melt index of 6.0 g/10 min (AGILITY™ 6047G from The Dow Chemical Company, USA); and a polypropylene resin, which is an isotactic polypropylene homopolymer having a density of 0.900 g/cc and a melt flow rate of 20 g/10 min (Polypropylene 6231, available from LyondellBasell Industries, USA).

Film Structures

Inventive Film 1

| Inventive Example 1 | Outer (wt. %) | Core (wt. %) | Outer (wt. %) |
|---|---|---|---|
| LDPE | 10 | 10 | 10 |
| LLDPE 1 | — | 90 | — |
| LLDPE 2 | — | — | — |
| Polyethylene Resin | 90 | — | 90 |

Inventive Film 2

| Inventive Example 2 | Outer (wt. %) | Core (wt. %) | Outer (wt. %) |
|---|---|---|---|
| LDPE | 10 | 10 | 10 |
| LLDPE 1 | — | — | — |
| LLDPE 2 | — | 90 | — |
| Polyethylene Resin | 90 | — | 90 |

Comparative Film 1

| Comparative Example 1 | Outer (wt. %) | Core (wt. %) | Outer (wt. %) |
|---|---|---|---|
| LDPE | 10 | 10 | 10 |
| LLDPE 1 | — | 90 | — |
| LLDPE 2 | — | — | — |
| Polyethylene Resin | — | — | — |
| Polypropylene | 90 | — | 90 |

Comparative Film 2

| Comparative Example 2 | Outer (wt. %) | Core (wt. %) | Outer (wt. %) |
|---|---|---|---|
| LDPE | 10 | 10 | 10 |
| LLDPE 1 | — | — | — |
| LLDPE 2 | — | 90 | — |
| Polyethylene Resin | — | — | — |
| Polypropylene | 90 | — | 90 |

Comparative Film 3

| Comparative Example 3 | Outer (wt. %) | Core (wt. %) | Outer (wt. %) |
|---|---|---|---|
| LDPE | 10 | 10 | 10 |
| LLDPE 1 | 90 | 90 | 90 |
| LLDPE 2 | — | — | — |
| Polyethylene Resin | — | — | — |
| Polypropylene | — | — | — |

Comparative Film 4

| Comparative Example 4 | Outer (wt. %) | Core (wt. %) | Outer (wt. %) |
|---|---|---|---|
| LDPE | 10 | 10 | 10 |
| LLDPE 1 | — | — | — |
| LLDPE 2 | 90 | 90 | 90 |
| Polyethylene Resin | — | — | — |
| Polypropylene | — | — | — |

Preparation of Laminates

The inventive and comparative films are bonded using ultrasonic bonding to a spunbond polypropylene nonwoven having a basis weight of 18 gsm. The films are ultrasonically bonded using a HiQ DIALOG ultrasound device. The welding force is 800-2300 N, the frequency is 20 kHz, the amplitude is 25 microns, and the bonding time was 300 msec.

Results

TABLE 1

| | Multilayer Film Properties | | | | | |
|---|---|---|---|---|---|---|
| | Inv. Film 1 | Inv. Film 2 | Comp. Film 1 | Comp. Film 2 | Comp. Film 3 | Comp. Film 4 |
| Puncture resistance, ft * lb/in³ | 98.4 | 97.4 | 175.8 | 181.4 | — | — |
| Spencer Dart Impact, g/mil | 562.1 | 366.9 | 457.6 | 364.5 | — | — |
| 2% Secant Modulus CD, psi | 33747.1 | 33946.1 | 41161.1 | 41182.4 | — | — |
| 2% Secant Modulus MD, psi | 30960.5 | 31073.9 | 41648.5 | 41871.5 | — | — |
| Break Stress CD, psi | 3745.5 | 3788.9 | 4228.4 | 4831.4 | — | — |
| Break Stress MD, psi | 5703.9 | 5602.4 | 6410.4 | 5410.8 | — | — |

TABLE 2

| | Inv. 1 | Inv. 2 | Comp. 1 | Comp. 2 | Comp. 3 | Comp. 4 |
|---|---|---|---|---|---|---|
| Laminate Properties | | | | | | |
| Peel Strength @ 1700 N (lb/in) | 1.59 | 1.11 | 1.64 | 1.21 | 0.55 | 0.65 |

Figure 1:
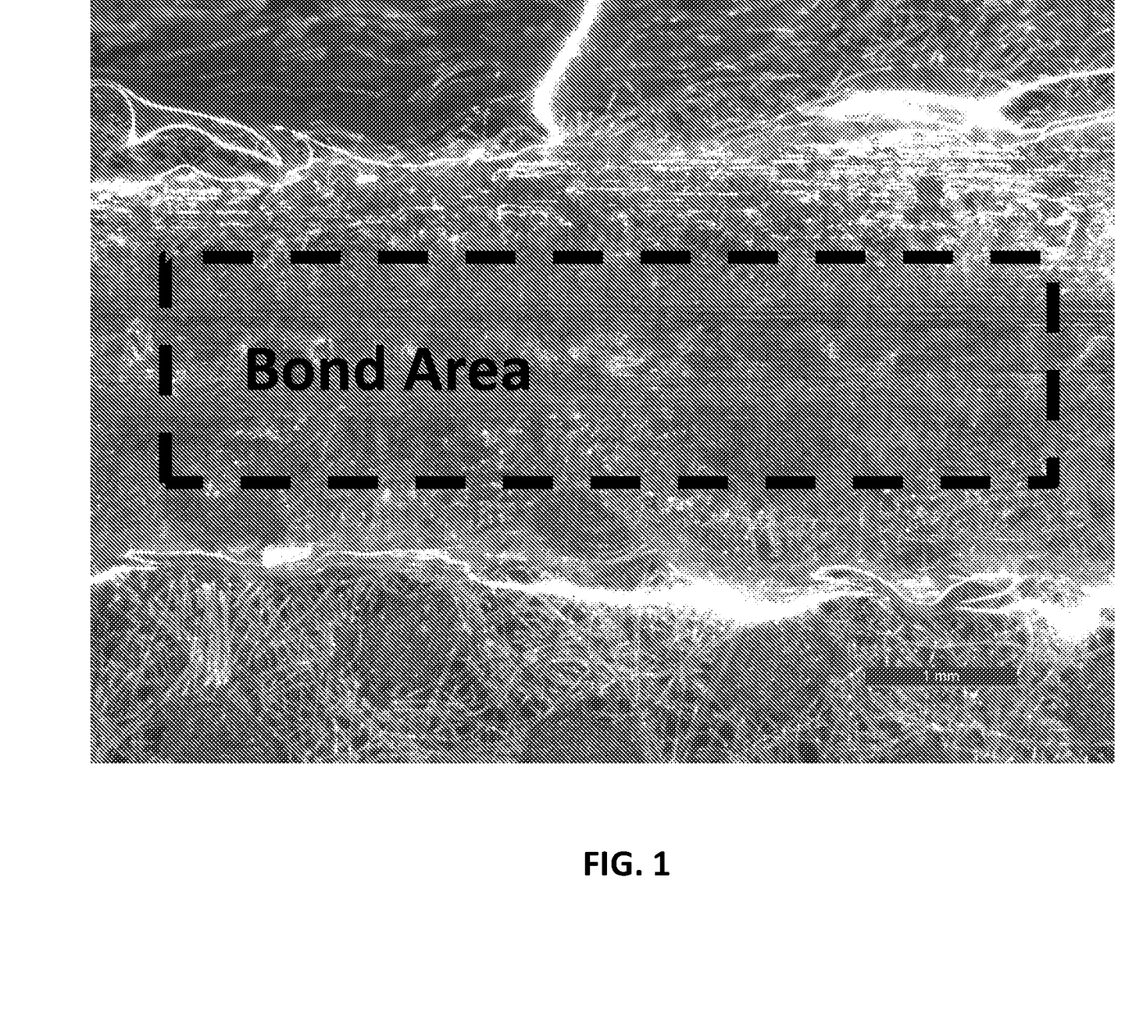
FIG. 1 micrographically depicts a bond area substantially free of pinholes for a laminate according to one or more embodiments shown or described herein.
Figure 2:
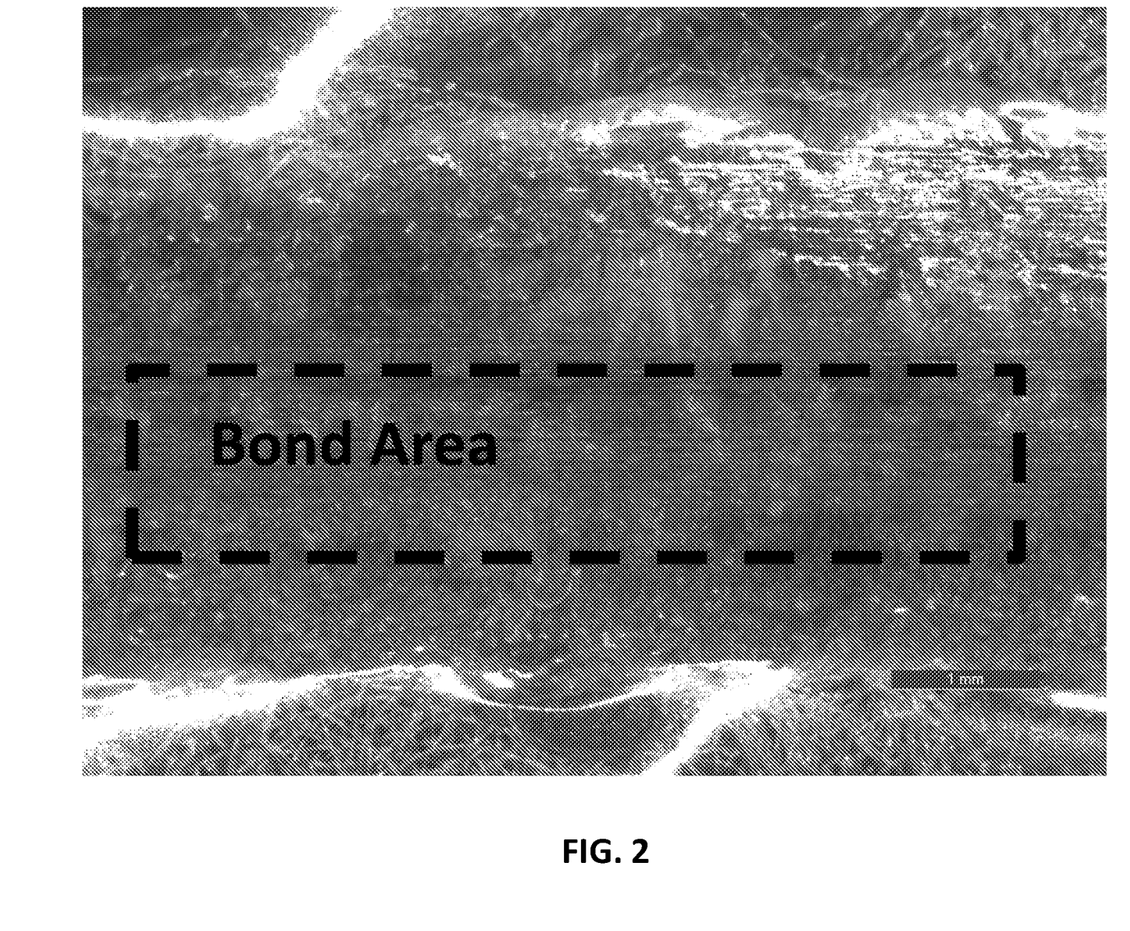
FIG. 2 micrographically depicts a bond area substantially free of pinholes for a laminate according to one or more embodiments shown or described herein.

The inventive laminates 1 and 2 have a comparable peel strength performance to comparative laminates 1 and 2, which use polypropylene in the outer layers. Comparative laminates 3 and 4 do not perform as well for peel strength as inventive laminates 1 and 2. Put another way, the inventive laminates, which use 100% polyethylene multilayer films, show surprisingly superior bonding with a polypropylene nonwoven over comparative laminates 3 and 4, and are as efficient as comparative laminates 1 and 2, which use multilayer films having polypropylene in the outer layers. FIG. 1 depicts a micrograph of the inventive 1 laminate and FIG. 2 depicts a micrograph of the inventive 2 laminate. In both figures, the bond areas of the laminates have good bonding, and are shown to be substantially free of pinholes.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, if any, including any cross-referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

The invention claimed is:

1. A multilayer polyethylene film comprising a core layer, a first outer layer, and a second outer layer, wherein:
    the core layer is positioned between the first outer layer and the second outer layer;
    the core layer comprises a linear low density polyethylene having a density of 0.900 g/cc to 0.935 g/cc and a melt index, $I_2$, of 0.1 g/10 min to 10 g/10 min, and, optionally, a first low density polyethylene resin having a density from 0.915 g/cc to 0.935 g/cc and a melt index, $I_2$, from 0.1 g/10 min to 15 g/10min; and
    the first outer layer and the second outer layer independently comprise a polyethylene resin having a density of 0.935 g/cc to 0.970 g/cc and a melt index, $I_2$, of 0.1 g/10 min to 15 g/10 min and, optionally, a second low density polyethylene resin having a density from 0.915 g/cc to 0.935 g/cc and a melt index, $I_2$, from 0.1 g/10 min to 15 g/10 min;
    wherein the density of the linear low density polyethylene is less than the density of the polyethylene resin,
    wherein the first outer layer comprises from 5 wt. % to 40 wt. % of the second low density polyethylene resin, based on the total weight of polymers present in the first outer layer.

2. The film of claim 1, wherein the core layer comprises from 5 wt. % to 40 wt. % of the first low density polyethylene resin, based on the total weight of polymers present in the core layer.

3. The film of claim 1, wherein the second outer layer comprises from 5 wt. % to 40 wt. % of the second low density polyethylene resin, based on the total weight of polymers present in the second outer layer.

4. The film of claim 1, wherein the ratio of the core layer to the first and second outer layers ranges from 50:50 to 90:10.

5. The film of claim 1, wherein the first outer layer has the same thickness as the second outer layer.

6. The film of claim 1, wherein the first outer layer has the same composition as the second outer layer.

7. A method of manufacturing the multilayer polyethylene film of claim 1, wherein the method comprises:
    coextruding a core layer, first outer layer, and a second outer layer to form a multilayer polyethylene film, wherein the multilayer polyethylene film comprises:
        the core layer positioned between the first outer layer and the second outer layer;
        the core layer comprising a linear low density polyethylene having a density of 0.900 g/cc to 0.935 g/cc and a melt index, $I_2$, of 0.1 g/10 min to 10 g/10 min, and, optionally, a first low density polyethylene resin having a density from 0.915 g/cc to 0.935 g/cc and a melt index, $I_2$, from 0.1 g/10 min to 15 g/10 min; and
        the first outer layer and the second outer layer independently comprising a polyethylene resin having a density of 0.930 g/cc to 0.970 g/cc and a melt index, $I_2$, of 0.1 g/10 min to 15 g/10 min and, optionally, a second low density polyethylene resin having a density from 0.915 g/cc to 0.935 g/cc and a melt index, $I_2$, from 0.1 g/10 min to 15 g/10 min;
        wherein the density of the linear low density polyethylene is less than the density of the polyethylene resin.
        Wherein the first outer layer comprises from 5 wt. % to 40 wt. % of the second low density polyethylene resin, based on the total weight of polymers present in the first outer layer.

8. An ultrasonically-bonded laminate comprising:
    the multilayer polyethylene film of claim 1; and
    a nonwoven substrate at least partially ultrasonically bonded to the multilayer film to form a laminate.

9. The laminate of claim 8, wherein the nonwoven substrate is formed from a polypropylene resin.

* * * * *